(12) United States Patent
Suetsugu

(10) Patent No.: US 7,403,121 B2
(45) Date of Patent: Jul. 22, 2008

(54) METHOD AND APPARATUS FOR GENERATING POSITION INFORMATION

(75) Inventor: Hajime Suetsugu, Itabashi (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 11/393,103

(22) Filed: Mar. 30, 2006

(65) Prior Publication Data

US 2007/0090952 A1   Apr. 26, 2007

(30) Foreign Application Priority Data

Oct. 21, 2005   (JP) .............................. 2005-307014

(51) Int. Cl.
*G08B 13/14* (2006.01)

(52) U.S. Cl. ..................... 340/572.1; 340/988; 235/385

(58) Field of Classification Search .............. 340/572.1, 340/988, 539.13, 825.49; 705/22; 235/385
See application file for complete search history.

(56) References Cited

U.S. PATENT DOCUMENTS

| | | | | |
|---|---|---|---|---|
| 4,319,243 | A * | 3/1982 | Vachenauer et al. | 342/37 |
| 5,677,841 | A * | 10/1997 | Shiomi et al. | 701/120 |
| 6,281,797 | B1 * | 8/2001 | Forster et al. | 340/572.3 |

* cited by examiner

*Primary Examiner*—Phung T Nguyen
(74) *Attorney, Agent, or Firm*—Greer, Burns & Crain, Ltd.

(57) ABSTRACT

A positioning terminal for generating position information of an object being transported includes a radio frequency identification (RFID) module for storing status information of the object relative to at least two predefined locations, and a communication module for sending position information of the object to a control center. A controller reads the status information from the RFID module at predefined intervals, and controls activation of the communication module based on the status information.

18 Claims, 6 Drawing Sheets

FIG. 4

| FLIGHT NUMBER | DEPARTING AIRPORT | DEPARTING TIME | ARRIVING AIRPORT | ARRIVAL TIME |
|---|---|---|---|---|
| ... | ... | ... | ... | ... |
| FJ201 | HANEDA | 11:50 | OSAKA | 13:15 |
| FJ203 | HANEDA | 13:40 | OSAKA | 15:05 |
| FJ205 | HANEDA | 15:30 | OSAKA | 16:55 |
| ... | ... | ... | ... | ... |

METHOD AND APPARATUS FOR GENERATING POSITION INFORMATION

FIELD OF INVENTION

The present invention relates to a technology for realizing and improving tracking ability of moving objects in the field of shipping and transportation.

BACKGROUND OF THE INVENTION

Application and utilization of Radio Frequency Identification (RFID) in the fields of physical distribution, load distribution, and product manufacturing are known. An RFID device is also called an IC tag or a radio frequency tag, and generally includes a small antenna and a very small IC module which is provided with a memory. Data can be read from or written to the memory using an RFID reader/writer.

In the field of transportation involving the use of aircrafts, there is a need to track and record the freight transportation route. One way to satisfy such need is the use of Global Positioning System (GPS). Specifically, a GPS terminal is attached to a freight including a GPS module and a communication module for transmitting and receiving the position information obtained by the GPS module to and from a control center.

However, origination of signals from a GPS terminal from within an aircraft is legally prohibited. Therefore, it is required that the function of the GPS terminal be validated only during land transportation. As such, the GPS module and the communication module of the GPS terminal are manually invalidated before the start of transportation by an aircraft. These modules are manually validated again when the land transportation starts again.

For solving a part of this problem, a technology is known in which sensors are used to inactivate the GPS terminal when the terminal is determined to be within an aircraft. However, this technology is not provided with any means for detecting the transfer of the GPS terminal to the outside of the aircraft.

Moreover, even if it is possible to use various systems including the GPS terminal to detect whether the terminal is within an aircraft, it is desirable to restrain the operation of the terminal when inside of the aircraft. It may also be possible to suspend and activate the GPS terminal with reference to information relating to the operation time of the aircraft by storing that information into the GPS terminal. However, if the actual operation time is changed from the stored information, there is a risk that the GPS terminal will be activated during the flight.

SUMMARY OF THE INVENTION

The present invention is directed to a positioning terminal for generating position information of an object being transported. The positioning terminal includes a radio frequency identification (RFID) module for storing status information of the object relative to at least two predefined locations, and a communication module for sending position information of the object to a control center. A controller reads the status information from the RFID module at predefined intervals, and controls activation of the communication module based on the status information.

BRIEF DESCRIPTION OF THE DRAWINGS

FIG. 4 is a sample database of flight information, which may be accessed by the positioning terminal of FIG. 1;

DETAILED DESCRIPTION OF THE INVENTION

Figure 1:
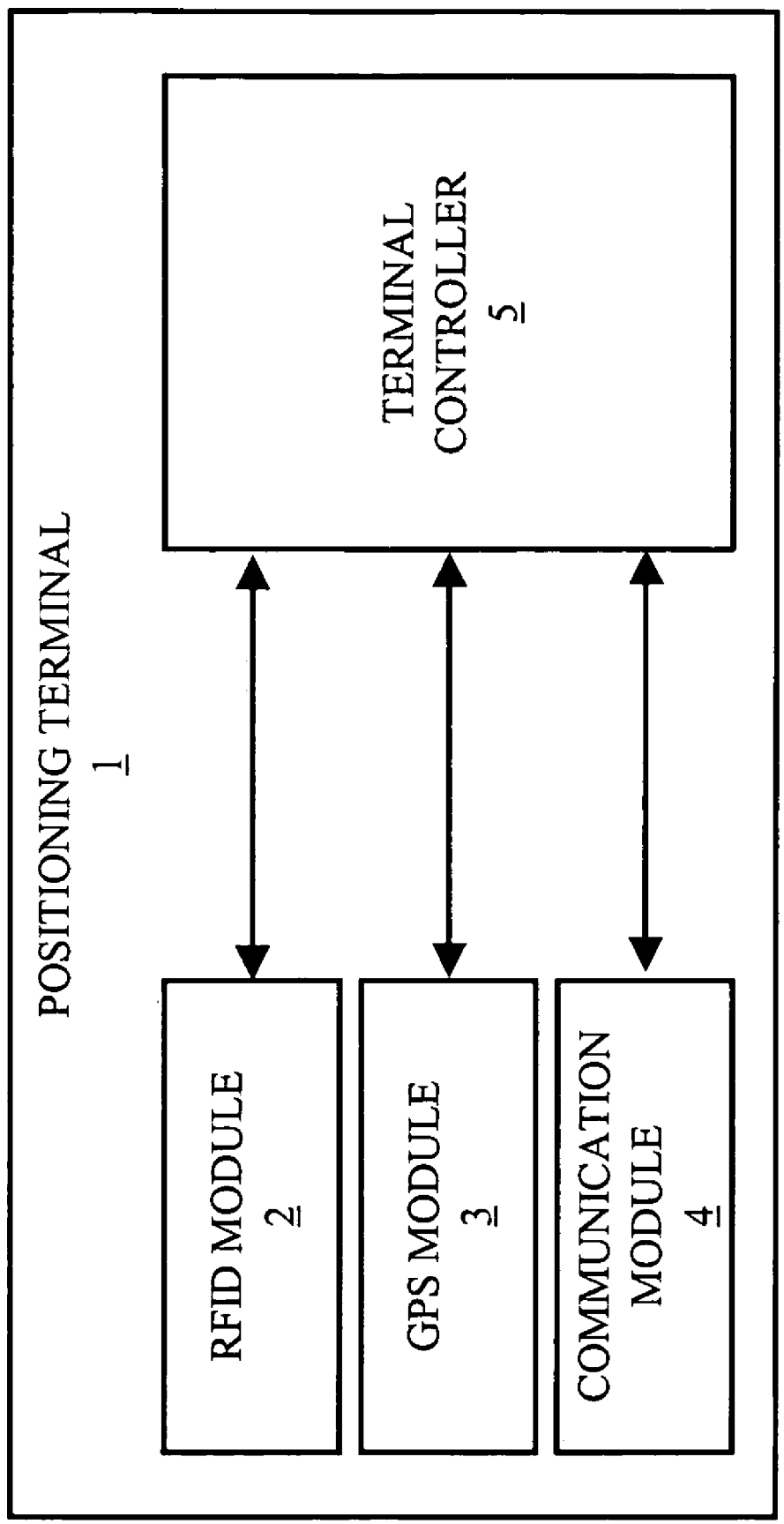
FIG. 1 is a block diagram of a positioning terminal in accordance with one embodiment of present invention.

The present invention will be explained below with reference to the accompanying drawings. FIG. 1 illustrates a structure of a positioning terminal 1 in accordance with one embodiment of the present invention. The positioning terminal 1 is adapted to be used for tracking the position of a freight or any moving object from a control center (not shown). The position information of the freight such as the latitude and the longitude is obtained by transmitting and receiving signals to and from an artificial satellite, and by transmitting and receiving signals to and from the control center.

The positioning terminal 1 is provided with a radio frequency identification (RFID) module 2, a global positioning system (GPS) module 3, a communication module 4 and a terminal controller 5. The RFID module 2 includes an antenna and an IC module. The GPS module 3 is provided to obtain the position information of the positioning terminal 1, such as the latitude and the longitude, by transmitting and receiving the signals to and from an artificial satellite. The communication module 4 is provided for transmitting and receiving data to and from a control center including the position information obtained with the GPS module 3. The communication module enables the control center to accumulate the position information of the positioning terminal 1, and accordingly, the accompanying freight being transported.

The terminal controller 5 is used for reading data from the memory of the RFID module 2 and for controlling the functions of the GPS module 3 and the communication module 4. The terminal controller 5 may be implemented as a software program adapted to run in a processor or it may also be implemented as a firmware or using hard circuitry.

Figure 2:
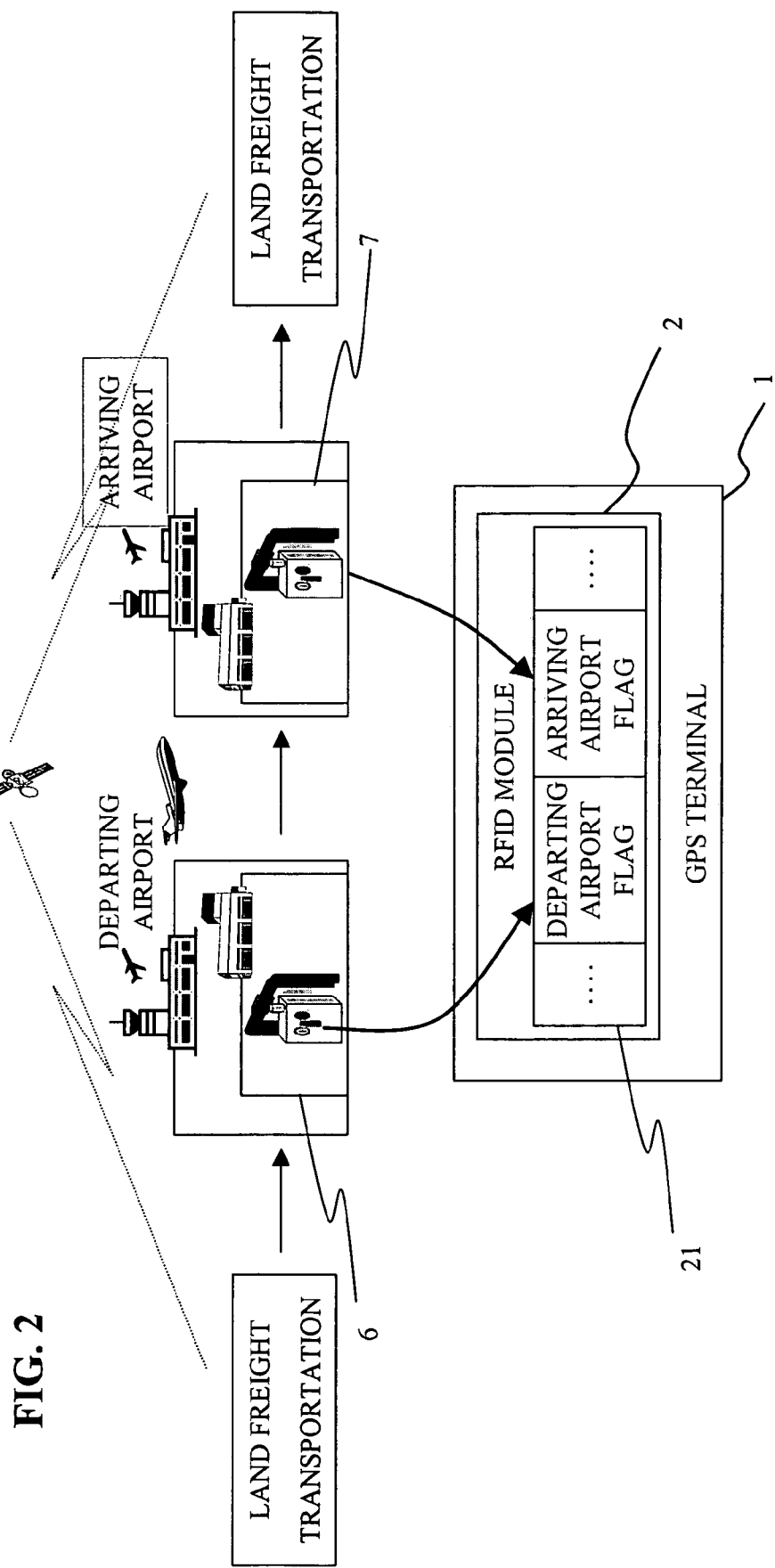
FIG. 2 is a diagram of an environment in which the positioning terminal of FIG. 1 is implemented in accordance with one embodiment of the present invention.

Tracking of a freight by the positioning terminal 1 is now explained with reference to FIG. 2. The present invention assumes transportation of a freight by an aircraft, as one example. However, land and sea transportation are also contemplated.

At the start, the positioning terminal 1 is made to accompany the freight or object being transported. Typically, freight is transported to the departing airport by land transportation and passed through an RFID reader/writer 6 provided at the departing airport, where a predetermined value is written in the predetermined area of an RFID memory 21 in the RFID module 2. An example of the RFID memory 21 is shown in FIG. 3(a), which shows that a flag is set in the "departing airport flag" field.

The freight having completed the process at the departing airport is then passed through an RFID reader/writer 7 provided at the arriving airport. Here, another predetermined value is written to the predetermined area of the RFID memory 21 provided in the RFID module 2. In the example shown in FIG. 3(a), a flag is set in the "arriving airport flag" field. The freight is then transported by land transportation to its next destination.

Figure 3:
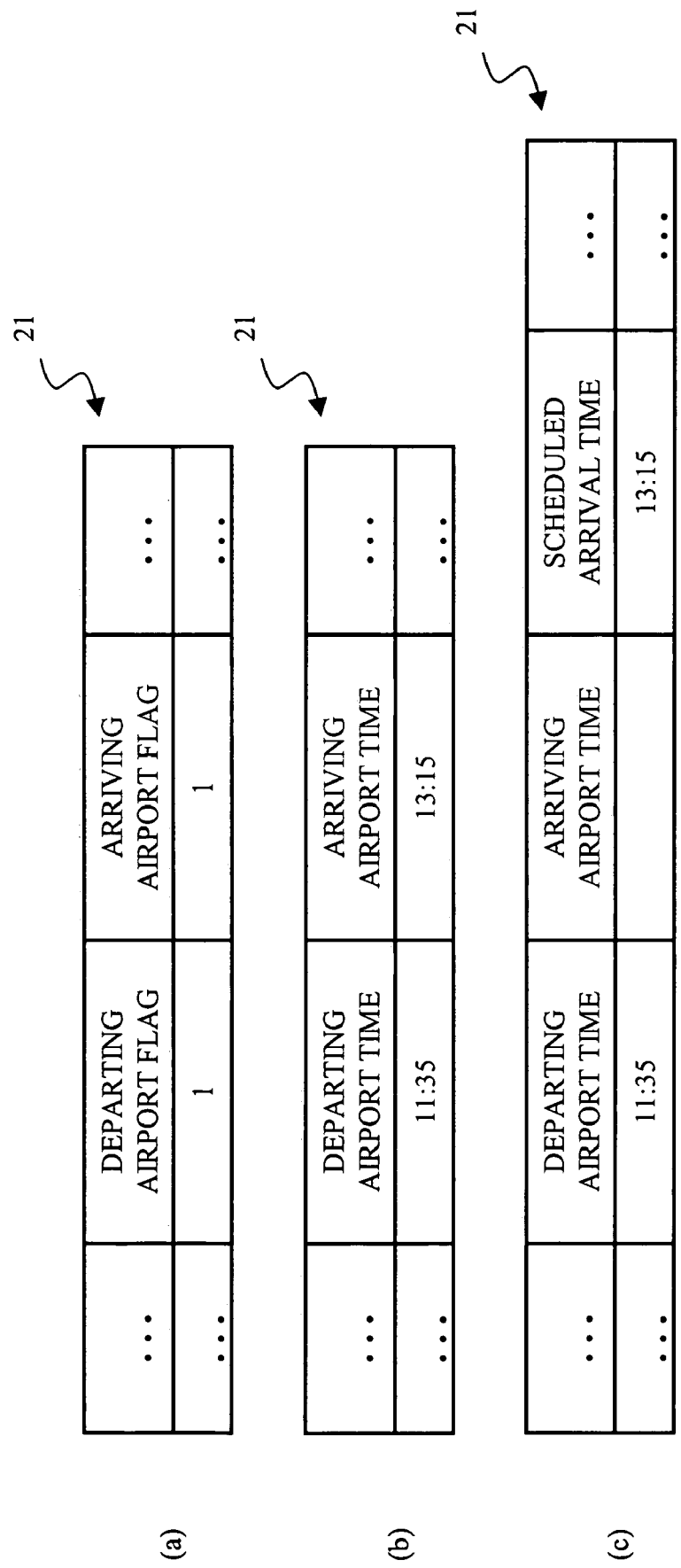
FIGS. 3(a)-3(c) are sample formats of a memory in an RFID module shown in FIG. 1.

FIGS. 3(a)-3(c) illustrate different examples of the structure of the RFID memory 21 provided in the RFID module 2. The RFID memory 21 of FIG. 3(a) is an example of the memory provided with the fields for the "departing airport flag" and the "arriving airport flag". When the freight passes through the RFID reader/writer 6 provided at the departing airport, "1" is written to the "departing airport flag" field, and when the freight passes through the RFID reader/writer 7 provided at the arriving airport, "1" is written to the "arriving airport flag" field.

FIG. 3(b) is an example in which the RFID memory 21 is provided with field for "departing airport time" and "arriving airport time". The respective times are written when the freight passes through the RFID reader/writers 6, 7 at the departing airport and arriving airport, respectively. The RFID memory 21 of FIG. 3(c) is provided with a field for "scheduled arrival time" in addition to the fields for the departing and arriving times shown in FIG. 3(b). This field is provided to enable the RFID reader/writer 6 of the departing airport to write the scheduled arrival time at the arriving airport.

The scheduled arrival time for each flight number is normally listed in a typical operation time table 8 illustrated in FIG. 4, which may be stored in a storage device of an airport computer system accessible by the RFID reader/writers 6, 7. For example, in the case where a freight is loaded in the flight number "FJ201", the RFID reader/writer 6 at the departing airport writes the value "13:15" from the "arrival time" field read from the operation time table 8, in the "scheduled arrival time" field of the RFID memory 21.

Figure 5:
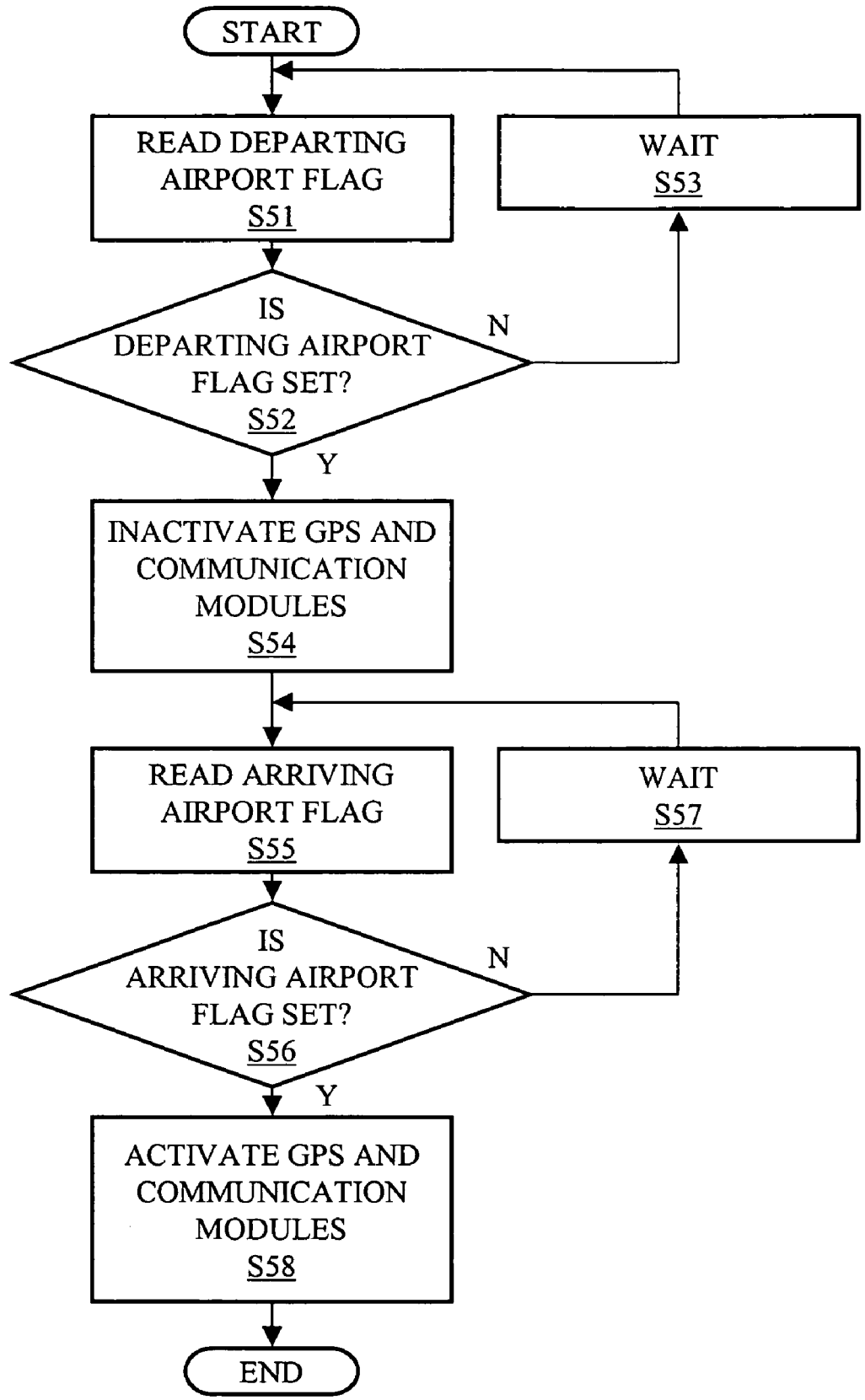
FIG. 5 is a flowchart describing a process for tracking the positioning terminal in accordance with one embodiment of the present invention.

FIG. 5 illustrates a process for tracking the position of a freight in accordance with one embodiment of the present invention. The RFID module 2 is assumed to be provided with the RFID memory 21 shown in FIG. 3(a). In steps S51 to S53, a polling process is executed, where the predetermined area of the RFID memory 21 is read every predetermined time. More specifically, in step S51, data is read from the "departing airport flag" field of the RFID memory 21 by the terminal controller 5.

In step S52, it is determined whether the departing airport flag is set from the read data. For example, whether the value "0" has been updated to "1" is determined. If the value "1" has been written as the predetermined value in the "departing airport flag" field of the RFID memory 21 by the RFID reader/writer 6 of the departing airport, the process goes to step S54. If not, the process goes to step S53 for a predetermined time period, after which the process goes back to step S51. The predetermined time period in the step S53 may be set so as to minimize power consumption of the positioning terminal 1.

In step S54, the terminal controller 5 executes the operations to inactivate the GPS module 3 and the communication module 4. In steps S55 to S57, the polling process similar to that of steps S51 to S53 is also executed in order to monitor the "arriving airport flag" field of the RFID memory 21. In step S55, data is read from the "arriving airport flag" field of the RFID memory 21 instead of "Departing airport flag" as in step S51.

In step S56, whether the read data is a predetermined value is determined. In other words, a determination is made as to whether the arriving airport flag is set. If "1" has been written as the predetermined value in the "arriving airport flag" field of the RFID memory 21 by the RFID reader/writer 7 at the arriving airport, the process goes to the step S58. If not, the process goes to step S57 for a predetermined time period, after which the process goes back to step S55. In step S58, operations of the GPS module 3 and the communication module 4 are activated again by issuing a control command to these modules by the terminal controller 5.

In the RFID memory 21 of FIG. 3(b), the current time is written in the RFID memory 21 in place of the predetermined flag. As such, the conditions in steps S52 and S56 may also be satisfied when the departing airport time and the arriving airport time are written in their respective fields of the RFID memory 21.

Figure 6:
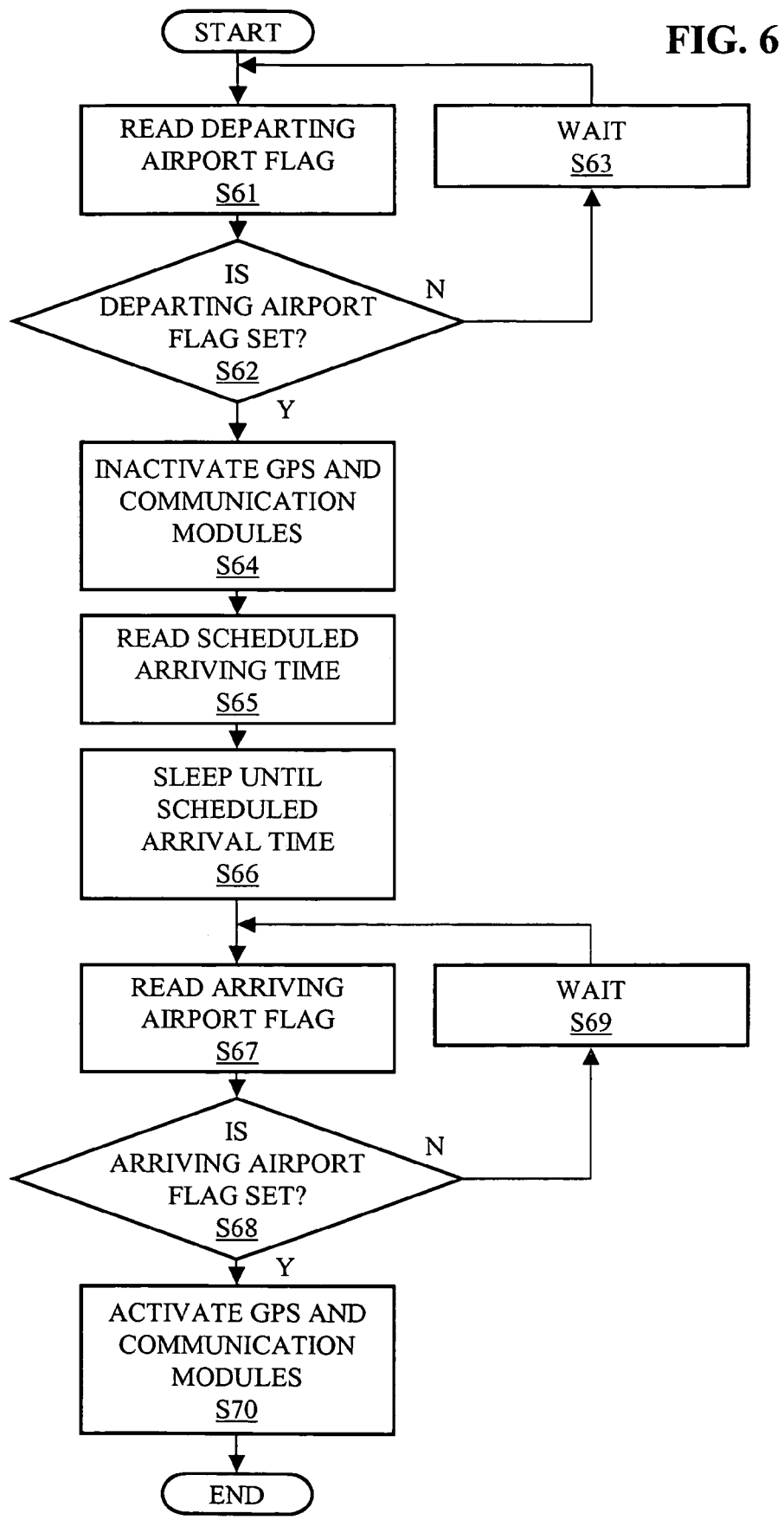
FIG. 6 is a flowchart describing a process for tracking the positioning terminal in accordance with another embodiment of the present invention.

The flowchart of FIG. 6 illustrates an example of the process in which the "scheduled arrival time" is written in the RFID memory 21 shown in FIG. 3(c) by the RFID reader/writer 6 at the departing airport. Although not illustrated, the RFID reader/writer 6 is adapted to access the operation time table 8 (shown in FIG. 4) available from the airport computer system. The corresponding scheduled arrival time from the table 8 is written in the "scheduled arrival time" field of the RFID memory 21 at the time the freight and the accompanying positioning terminal 1 pass through and make communication with the RFID reader/writer 6 at the departing airport. In the example illustrated in FIG. 3(c), the time "13:15" is written in the "scheduled arrival time" field.

The polling process in the steps S61 to S64 are similar to the processes in steps S51 to S54 of FIG. 5. In step S65, time data is read from the "scheduled arriving time" field of the RFID memory 21. In step S66, all functions other than the function required for determining whether the scheduled arrival time has come, are suspended until the actual scheduled arrival time.

In the example of FIG. 5, the terminal controller 5 executes the processes for checking for the arriving airport flag in steps S55 to S57, even during the flight. Accordingly, operations of the positioning terminal 1 consume some electric power, although only a little. However, in the example of FIG. 6, since the process of step S66 is executed, the same processes in steps S67 to S69 for checking for the arriving airport flag are not executed until the scheduled arrival time. In this manner, operations and power consumption can be restrained.

It is contemplated that a deviation may occur between the scheduled arrival time and the actual arrival time of the aircraft. However, in the environment in which the present invention is applied, it is desired that no signal from the GPS module 3 or the communication module 4 be generated within the aircraft. Therefore, the restarting functions of the GPS module 3 immediately after arriving at the arriving airport is low in comparison with the importance of the condition described above. Accordingly, the process of step S66 is effective for its intended purpose. To prevent the GPS module 3 from restarting while the freight and the positioning terminal 1 are still loaded in the aircraft, the terminal controller 5 recognizes arrival at the arriving airport through communication with the RFID module 2.

The polling processes in steps S67 to S68 for monitoring the "arrival airport flag" field of the RFID memory 21 are similar to those of steps S55 to S57 in FIG. 5. The GPS module 3 and the communication module 4 are activated in step S70 when the flag is set in the "arriving airport flag" field of the RFID memory 21.

The present invention is not limited only to the embodiments disclosed above but allows various changes and modifications without departing from the scope of claims.

According to the present invention, the GPS and the communication functions of a positioning terminal for tracking the position information of a freight can be automatically inactivated without any manual operations, so that generation of electric waves can be restrained during transportation in an aircraft. Moreover, operations such as GPS function or the like can be reactivated when transportation by the aircraft is terminated.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An apparatus for generating position information of a transported object, comprising:
    a radio frequency identification (RFID) module for storing status information of the object relative to at least two predefined locations;
    a communication module for sending position information of the object to a control center; and
    a controller for reading said status information from said RFID module at predefined intervals, and controlling activation of said communication module based on said status information.

2. The apparatus as defined in claim 1, further comprising:
    a global positioning system (GPS) module for obtaining said position information;
    wherein said controller controls activation of said GPS module based on said status information stored in said RFID module.

3. The apparatus as defined in claim 2, wherein said controller inactivates said communication module and said GPS module when a position of the object is between said two predefined locations; and activates said communication module and said GPS module when said position of the object is outside said two predefined locations.

4. The apparatus as defined in claim 3, wherein said status information indicates whether said RFID module has passed through a first predefined location and a second predefined location.

5. The apparatus as defined in claim 3, wherein said status information indicates a time said RFID module has passed through a first predefined location and a time said RFID module has passed through a second predefined location.

6. The apparatus as defined in claim 3, wherein said status information indicates a time said RFID module has passed through a first predefined location, a time said RFID module has passed through a second predefined location, and a scheduled arrival time of said RFID module at said second predefined location;
    wherein said controller does not activate said communication module or said GPS module until after said scheduled arrival time.

7. The apparatus as defined in claim 1, wherein status information is provided by a radio frequency identification (RFID) reader/writer at said two predefined locations.

8. The apparatus as defined in claim 1, wherein said RFID module, said communication module and said controller are transported simultaneously with the object.

9. A method for generating position information of a transported object, comprising:
    storing status information of the object relative to at least two predefined locations, in a radio frequency identification (RFID) module;
    sending position information of the object to a control center using a communication module; and
    reading said status information from said RFID module at predefined intervals, and controlling activation of said communication module based on said status information.

10. The method as defined in claim 9, further comprising:
    obtaining said position information using a global positioning system (GPS) module;
    wherein said activation of said GPS module is based on said status information stored in said RFID module.

11. The method as defined in claim 10, wherein said communication module and said GPS module are inactivated when a position of the object is between said two predefined locations, and activated when said position of the object is outside said two predefined locations.

12. The method as defined in claim 11, wherein said status information indicates whether said RFID module has passed through a first predefined location and a second predefined location.

13. The method as defined in claim 11, wherein said status information indicates a time said RFID module passed through a first predefined location and a time said RFID module passes through a second predefined location.

14. The method as defined in claim 11, wherein said status information indicates a time said RFID module passes through a first predefined location and a second predefined location, and a scheduled arrival time of said RFID at said second predefined location;
    wherein said communication module and said GPS module are not activated until after said scheduled arrival time.

15. The method as defined in claim 9, wherein status information is provided by a radio frequency identification (RFID) reader/writer at said predefined locations.

16. A method for tracking a position of a transported object, comprising:
    enabling a tracking device to be transported with the object, said tracking device including a radio frequency identification (RFID) module, a communication module and a controller;
    storing status information of the object relative to at least two predefined locations in said radio frequency identification (RFID) module;
    sending position information of the object to a control center using said communication module; and
    reading said status information from said RFID module at predefined intervals, and controlling activation of said communication module based on said status information.

17. The method as defined in claim 16, wherein said tracking device further includes a global positioning system (GPS) module for obtaining said position information; and
    said controller controls activation of said GPS module based on said status information stored in said RFID module.

18. The method as defined in claim 17, wherein said controller inactivates said communication module and said GPS module when the object is positioned between said two predefined locations; and activates said communication module and said GPS module when said position of the object is outside said two predefined locations.

* * * * *